United States Patent [19]

Morton et al.

[11] Patent Number: 5,314,806
[45] Date of Patent: May 24, 1994

[54] **BIOLOGICAL DEGRADATION OF SODIUM OXALATE WITH *BACILLUS* AGAL N91/005579**

[75] Inventors: Robert A. Morton, Australind; Michael J. Dilworth; Barbara Wienecke, both of Murdoch, all of Australia

[73] Assignee: Worsley Alumina Pty. Limited, Collie, Australia

[21] Appl. No.: 687,872

[22] PCT Filed: Feb. 13, 1991

[86] PCT No.: PCT/AU91/00051

§ 371 Date: Jun. 6, 1991

§ 102(e) Date: Jun. 6, 1991

[87] PCT Pub. No.: WO91/12207

PCT Pub. Date: Aug. 22, 1991

[30] Foreign Application Priority Data

Feb. 13, 1990 [AU] Australia ............... PJ8576

[51] Int. Cl.$^5$ ............. C12P 1/00; C12N 1/20; C02F 1/00; C12M 1/04
[52] U.S. Cl. ..................... 435/41; 210/601; 435/252.5; 435/262.5; 435/313; 435/315; 435/818; 435/832
[58] Field of Search ............ 435/41, 252.5, 262.5, 435/313, 315, 818, 832; 210/601

[56] References Cited

U.S. PATENT DOCUMENTS 4,203,841  5/1980  Shimizu et al. ............... 210/205

FOREIGN PATENT DOCUMENTS 0313900  5/1989  European Pat. Off. .
0332134  9/1989  European Pat. Off. .
89/04356  3/1989  PCT Int'l Appl. .

OTHER PUBLICATIONS

*Derwent* WPI/L Online Abstract Accession No. 66-41270F, JP, B. 44-28476 (Ashai Chemical Industries, Co. Ltd.).
*Derwent* WPI/L Online Abstract Accession No. 87-332947, SU, A, 686463 (Moscow Lomonosov Univ.) Apr. 30, 1987.
*Derwent* Abstract Accession No. 88-097051/14, Class D15, SU, A, 1331889 (As Belo Microbiolog.) Aug. 23, 1987.
AU, A, 39465/89 (Alcan International Ltd), Feb. 15, 1990.
*Patent Abstracts of Japan*, M-77, p. 1368, JP, A, 52-19468 (Suntory K K) Feb. 14, 1977.
*Patent Abstracts of Japan*, C-311, p. 166, JP, A, 60-122099 (Fuji Denki Sougou Kenkyusho K K) Jun. 29, 1985.
*Database WPIL*, Accession No. 88-097051 [14], Derwent Publications Ltd., London, GB; & SU-A-331 889 (Kovalenko et al.).

*Primary Examiner*—David M. Naff
*Attorney, Agent, or Firm*—Finnegan, Henderson, Farabow, Garrett, and Dunner

[57] ABSTRACT

A method and system for the biological disposal of oxalate is described in which a biological reactor having an alkalophilic oxalate-degrading aerobic micro-organism in aqueous solution is employed. The biological reactor comprises a vessel containing the aqueous solution and having an input for receiving dissolved oxalate from a dissolver tank. Sodium oxalate, as a by-product or the Bayer process in an alumina refinery, can be introduced into the dissolver tank in solid form together with trace elements and nutrients for biological growth. The system operates as a continuous feed process with dissolved oxalate being pumped from the dissolver tank into the biological reactor vessel continuously in a controlled manner. The biological reactor further comprises an aerator, including an oxygen probe for monitoring the level of dissolved oxygen in solution. Biological degradation of the sodium oxalate in a highly alkaline solution occurs in the biological reactor with sodium carbonate and bicarbonate formed as end products in an effluent. The effluent is then pumped to a causticiser reaction tank and settler tank for converting the sodium carbonate and bicarbonate in the effluent to useful sodium hydroxide which can be recycled in the Bayer process. The alkalophilic oxalate-degrading aerobic micro-organism is preferably Bacillus AGAL N91/005579.

8 Claims, 5 Drawing Sheets

BIOLOGICAL DEGRADATION OF SODIUM OXALATE WITH *BACILLUS* AGAL N91/005579

FIELD OF THE INVENTION

The present invention relates to a method and system for the biological treatment of oxalates in general, and relates particularly to a method and system for substantially disposing of oxalate produced as an industrial by-product using a micro-organism as the biological agent. More particularly, though not exclusively, the invention is directed to a method and system for biological disposal of oxalate produced as a by-product of the Bayer refinery process using an oxalophilic micro-organism.

Although the present invention will be described with particular reference to the biological disposal of sodium oxalate, it will be understood that the invention is not limited to a method and system for biologically disposing of this particular oxalate. The method and system of the invention has wider applications where the reduction, removal or destruction of oxalates such as, for example, potassium oxalate, calcium oxalate or ammonium oxalate is required, as part of an industrial process or due to the problems they cause as pollutants or contaminants.

The present invention has particular application in the context of alumina refineries in which sodium oxalate is produced as a by-product of the refinery process.

DISCUSSION OF BACKGROUND ART

Sodium oxalate is a by-product of the Bayer refinery process used for producing aluminium hydroxide and alumina from bauxite. In the Bayer process, sodium oxalate is removed from sodium aluminate liquor, following or during aluminium hydroxide precipitation, by feeding the sodium aluminate liquor or liquor enriched in sodium oxalate to a crystalliser containing seed crystals of sodium oxalate. These seed crystals induce precipitation of further sodium oxalate. Sodium oxalate is normally removed by thickening and/or filtering the sodium oxalate slurry. Sodium oxalate is an environmentally hazardous compound and must be disposed of carefully. Typically the filtered sodium oxalate is reduced to solid cake form and must be transported to another site for disposal by combustion or other means.

Another method currently employed for the disposal of sodium oxalate from the Bayer process involves chemical treatment of the oxalate with lime. However, one of the products of this chemical treatment is calcium oxalate which is equally difficult to dispose of in an environmentally acceptable manner.

Australian Patent Application No. 39465/89 in the name of ALCAN INTERNATIONAL LTD describes a method for the biodegradation of oxalate in solution which has been removed from a Bayer processing system. Micro-organisms for degrading oxalates are maintained in a bio-reactor. Preparatory to introducing the oxalate-containing composition to the bio-reactor the pH of the oxalate-containing solution is adjusted to be compatible with the micro-organisms in the medium. In the Alcan method the pH of the solution is adjusted to the neutral range by the addition of a suitable acid, such as sulphuric acid. In addition, it may also be necessary to adjust the concentration of $Na^+$ ions in the solution to a level which can be tolerated by the micro-organism developed to digest the oxalates. The micro-organisms employed were isolated from the soil of the rhizospheres of the oxalate producing plants *Dieffenbachia picta* and *Rheum rhaponticum* (Rhubarb), and it was believed that the prominent micro-organism which is capable of degrading oxalates is a Pseudomonas or Pseudomonas-like organism.

A significant disadvantage of the Alcan method of biodegradation of oxalate is the step of pretreatment of the oxalate-containing solution to adjust the pH to the neutral range and to reduce the sodium concentration to a level compatible with the micro-organisms. This pretreatment is necessary because the micro-organisms employed require an aqueous solution with pH in the neutral range and sodium concentration below a level of approximately 8000 mg/L. A further disadvantage is the need for an extended period of pre-stressing the microbial culture by exposure to varying concentrations of oxalates to ensure efficient oxalate degradation in the harsh environment of the oxalate-containing solution.

The present invention was developed with a view to providing a more economic and environmentally acceptable method of oxalate disposal using an oxalate-degrading micro-organism as the biological agent.

SUMMARY OF THE INVENTION

According to one aspect of the present invention there is provided a method of biological disposal of oxalate, the method comprising:

introducing the oxalate into a biological reactor containing an aqueous solution in which at least one alkalophilic oxalate-degrading aerobic micro-organism is present; and, maintaining the aqueous solution in an aerobic condition such that the oxalate in the reactor can be degraded by the at least one oxalate-degrading aerobic micro-organism.

Typically the oxalate introduced into the reactor is a by-product of an industrial process, such as, for example, ammonium oxalate, potassium oxalate, calcium oxalate or sodium oxalate. Preferably, the oxalate is sodium oxalate produced as a by-product of the Bayer process in an alumina refinery.

Preferably the method further comprises the initial step, prior to said step of introducing the oxalate into the biological reactor, of dissolving the sodium oxalate in an aqueous solution. Preferably said initial step also includes adding selected trace elements and nutrients for biological growth.

Typically the biological reactor employed in the method of the invention comprises a reservoir of alkaline aqueous solution. In the context of an alumina refinery the reactor may advantageously be provided by the refinery catchment lake or more preferably by a separate containment vessel.

Typically the micro-organisms are aerobic bacteria. Other oxalate-degrading micro-organisms have been identified and it is thought that some of these could be employed in the method of the invention. Genetically engineered micro-organisms could also be employed in the method of the invention.

Typically the pH level of the reactor solution is in the range 8.0 to 12.0. More typically, the pH level of the solution is in the range 9.0 to 11.0 compatible with the preferred aerobic alkalophilic bacterium, which is a Bacillus species.

Preferably the method of the invention further comprises maintaining the pH level of the reactor solution at a level in which the micro-organisms can thrive.

According to another aspect of the present invention there is provided a system for biological disposal of oxalate, the system including a biological reactor, the reactor comprising:

a reservoir for containing an aqueous solution in which at least one alkalophilic oxalate-degrading aerobic micro-organism is present, the reservoir having an input for receiving oxalate into the solution in a controlled manner for degradation, and an output for removing effluent from the reservoir; and, aerating means for aerating the solution contained in the reservoir to maintain a predetermined dissolved oxygen level in the solution whereby, in use, said at least one micro-organism is capable of degrading the oxalate in solution so that the concentration of oxalate in the effluent is substantially reduced.

Preferably the reservoir employed is in the form of a vessel and typically said aerating means comprises a piping grid mounted in the vessel and fitted with self-cleaning nozzles for generating bubbles in the solution. Preferably said aerating means further comprises an oxygen probe for monitoring the level of dissolved oxygen in the solution, and control means for controlling the generation of bubbles responsive to a signal from the oxygen probe whereby, in use, said predetermined dissolved oxygen level is maintained between 1 to 10 mg/L. More preferably the dissolved oxygen level is maintained between 4 to 7 mg/L.

Preferably the system further comprises:

a separate dissolver tank for dissolving oxalate-containing solids in an aqueous solution and preferably for dissolving nutrients added to the aqueous solution for biological growth; and, a pump for pumping the dissolved oxalate and nutrients in solution into the biological reactor.

The solution may also be aerated by introducing an oxygen producing micro-organism into the biological reactor, whereby oxygen produced by the micro-organism is consumed by the oxalate-degrading aerobic micro-organism.

Typically the micro-organisms employed in the reactor are alkalophilic bacteria, more typically of the genus Bacillus.

Typically the oxalate-degrading micro-organism is capable of converting sodium oxalate to sodium hydrogen carbonate according to the equation:

$$2Na_2C_2O_4 + 2H_2O + O_2 \rightarrow 4NaHCO_3$$

Typically the reactor solution is maintained at temperatures between 16° to 34° C., more typically between 24° C. to 32° C.

According to still a further aspect of the present invention there is provided a biologically pure culture of Bacillus species AGAL N91/005579.

Preferred embodiments of the method and system of the invention will now be described, by way of example only, with reference to the accompanying drawings.

DETAILED DESCRIPTION OF PREFERRED EMBODIMENTS

Figure 1:
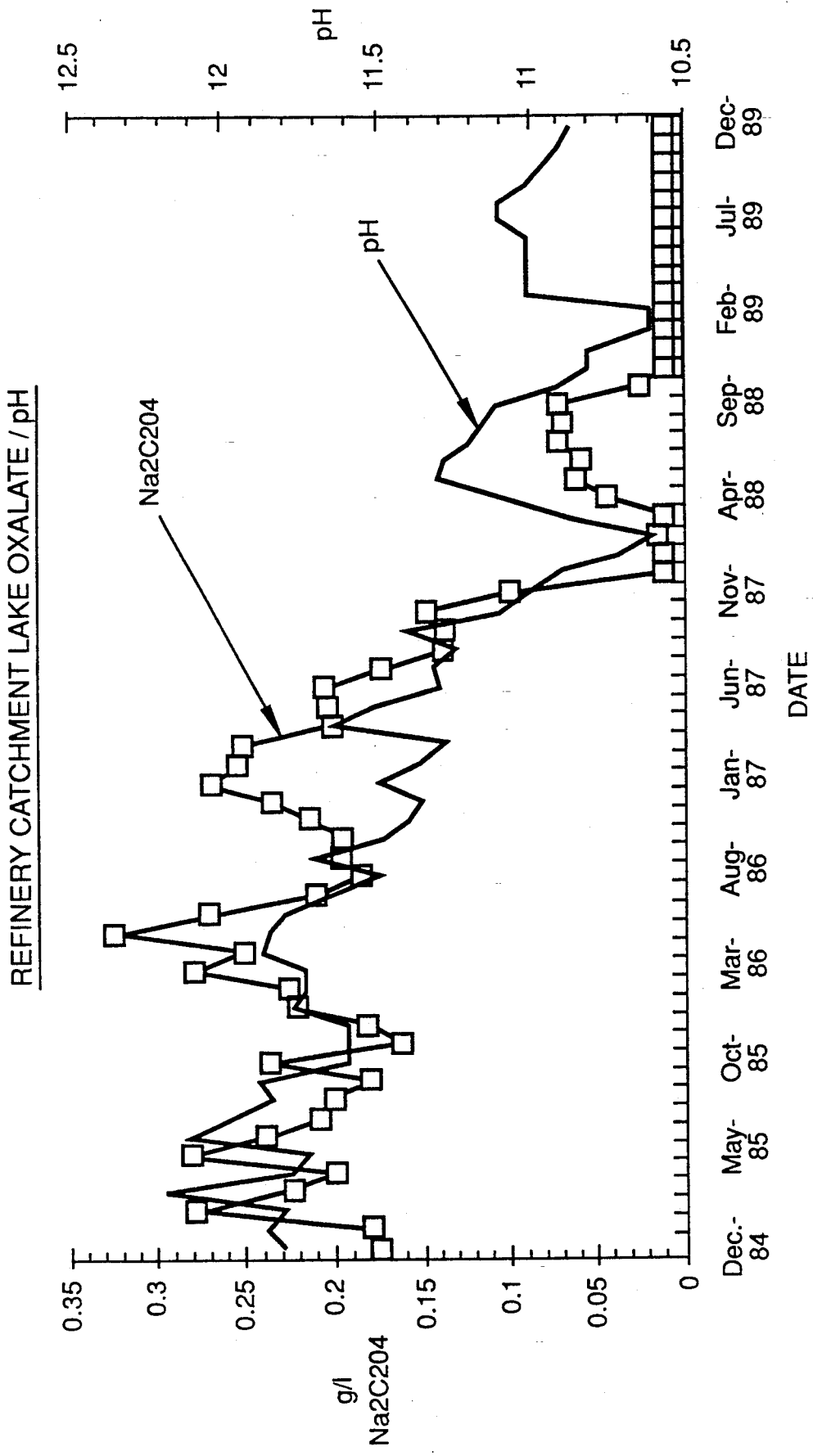
FIG. 1 is a graphical representation of the variation over a period of time in the concentration of sodium oxalate in the refinery catchment lake, and in the pH level of the lake.

The refinery catchment lake (RCL) of an alumina refinery is, as the name suggests, a catchment lake for cooling water employed throughout the alumina refinery. Heated water is returned to the catchment lake where it cools and can then be recycled through plant heat exchangers in various areas of the refinery and in the power-house. Sodium oxalate should not normally be present in the cooling water, however, low concentrations of sodium oxalate have been detected in the catchment lake due probably to run-off into the lake. FIG. 1 illustrates the variation over a period of time in sodium oxalate concentration in the RCL. Also illustrated in FIG. 1 is the variation in pH level in the lake over the same period, which shows a remarkable correlation with the variation in concentration of sodium oxalate. This strong correlation between the pH level and the concentration of sodium oxalate alerted the refinery to the possibility of biological degradation occurring in the catchment lake, and led to the development of the method and system for biological disposal of oxalate according to the invention.

The isolation and characterisation of the microorganism responsible for oxalate degradation in the RCL will now be described in detail. This is the preferred micro-organism employed in the method and system of the invention, since it is an alkalophile and is capable of growing under the highly alkaline conditions associated with Bayer Alumina refineries. RCL water samples were collected from the sampling point on the cooling water intake of the RCL at Worsley Alumina Refinery, Collie, Western Australia 6225, Australia.

Sterilisation

Media were sterilised either by autoclaving for 15 minutes at 121° C. or filtration through either 0.45 um Millipore membrane filters, or in later experiments with 0.2 um filters. In liquid media passed through filters of the larger pore size, some bacteria growth was detected; 0.2 um filters produced full sterilisation.

Solid Media

The medium, in its inorganic components, was similar to that of Brown and Dilworth (1975) (Brown, C. M. Dilworth, M. J. (1975). Ammonia assimilation by Rhizobium cultures and bacteroids. Journal of General Microbiology, 86: 39–48), with (per liter) 0.5 g $KNO_3$, 0.05 g $K_2HPO_4$, 0.67 g NaCl, 0.94 g $NaSO_4$, 5 g $MgSO_4.7H_2O$, 0.4 g $CaCl_2.2H_2O$; minor elements were added as a stock solution as described by Brown and Dilworth (1975). The pH was adjusted by adding 20 mM $Na_2CO_3/NaHCO_3$ buffers of pH 8.0, 9.5, 10.0 or 10.5.

Oxalate was added as sodium oxalate initially only at 1 g.L$^{-1}$. Later experiments used 5, 10 or 20 g.L$^{-1}$ at pH 10.0 only. Media were solidified with 2% (w/v) agar from Coast; Gibco agar appeared to contain considerably greater amounts of background carbon compounds able to support bacterial growth when no carbon source had been added.

Liquid Media

Liquid media were of the above composition minus agar.

Growth Conditions

All media/samples were incubated at 28° C., liquid cultures in 50 ml volumes in 250 ml polypropylene or glass Erlenmeyer flasks, or in 10 ml volumes in 30 ml McCartney bottles. Liquid cultures were shaken on a rotary platform shaker operating at ca 120 r.p.m.

Isolation and Characterisation of Bacteria

Refinery catchment lake water samples were initially treated by adding 1.0 g of analytical grade sodium oxalate and then incubating the samples at 28° C. on a rotary platform shaker operating at ca 120 r.p.m. After incubation the cultures were streaked onto oxalate agar plates and incubated at 28° C. These cultures contained a mixture of micro-organisms. Mixed liquid cultures were produced by inoculating colonies from these agar plates into liquid media. Isolation of a pure culture of the large Bacillus sp. required a prior 15 min 80° C. treatment of a mixed liquid culture which had been degrading oxalate. Oxalate metabolism was tested by inoculating colonies of the isolated bacteria into liquid media and assessing the oxalate concentration by Ion Chromatography. The Bacillus sp. was further characterised by recording growth on media containing carbon sources other than oxalate, and subjecting it to a series of standard biochemical tests.

Electron microscopy used negative staining with 1% phosphotungstic acid after fixation in 3% glutaraldehyde in 0.25M phosphate buffer (pH 7.0) and is the source of the estimated size of the organism. Oxalate was measured by Ion Chromatography at the laboratory of Worsley Alumina. pH measurements were made with a Orion Model EA940 pH meter and were routinely standardised against a pH 9 buffer. Flagella staining was by the method of Kodaka et al., (1982). Motility was observed in wet mounts at 400 x magnification.

Bacterial Isolation

The three different bacteria found on most oxalate agar plates were:
(1) a large Gram-positive spore-forming Bacillus species forming white colonies turning brown as colonies aged;
(2) a small Gram-variable rod, producing red colonies on oxalate agar;
(3) a slow-growing filamentous, Gram-positive organism (possibly actinomycete), growing in white, columnar colonies up to 8 mm high, and producing aerial spores.

Colonies of the Bacillus species often contained contamination from organism (2); purification involved heat treatment (80°/15 min) of the initial mixed sample from RCL water to eliminate organism (2). The survival of the Bacillus species presumably results from heat-resistant spores. Plates often contained mixed colonies of (2) and (3).

In single culture tests for oxalate degradation, the Bacillus species degraded oxalate while the others, singly or in combination, did not (Table 1).

TABLE 1

Oxalate concentrations ($mg.L^{-1}$) in cultures inoculated with organisms isolated in pure culture. The initial concentration was 5000 $mg.L^{-1}$ sodium oxalate.

| Organism | Day 1 | 2 | 3 | 4 |
|---|---|---|---|---|
| (2) | 5150 | 5150 | 5200 | 5200 |
| (3) | 4900 | 4950 | 5150 | 5200 |
| (2) & (3) | 5000 | 4900 | 5200 | 5500 |
| (1) | 5000 | 3020 | 1580 | 0 |

The isolation of organisms (2) and (3) on oxalate agar was apparently due to traces of organic compounds present in the agar; there was even more growth on oxalate agar made with Gibco agar.

Growth at Different pH Values

On oxalate agar, good growth of the Bacillus species occurred at pH values of 10 and 10.5; growth was much less at pH 9 and only just detectable at pH 8. At pH 8, no further growth occurred after the first day of incubation at 28° C. These data are consistent with these bacteria being alkalophiles—only able to grow under alkaline conditions.

Characteristics of the Isolated Bacillus Species

Figure 5:

The Bacillus species had the following characteristics:
a) Morphological—straight rods, curved ends, dimensions 1.8 um×0.4 um (see FIG. 5), Gram-positive, motile (wet mounts) flagella observed with flagellar stain in light microscopy but not by EM. Spores round; sub-central to central non-aggregating in oxalate medium.
(b) Colonies on oxalate agar, pH 10.0 Smooth, raised; edge entire; colour initially white, turning to light cream with dark centre as cultures age.
(c) Nutritional
Aerobic
No absolute growth factor requirements
Growth on the following carbon compounds: Oxalate, glucose, mannose, starch, mannitol, ethanol, glycerol, formate, fumarate, malate, glutamate, glycine, alanine, asparagine, leucine
No growth on xylose, arabinose, urea.
(d) Biochemical
Positive for catalase and nitrate reductase
Produced acid but no gas from glucose
Hydrolysed starch
Oxidase positive
Indole positive
Citrate utilisation and Voges-Proskauer tests not used as these test function only at pH values where the organism does not grow.
(e) Taxonomic
The Gram-positive nature and the spore production classify the organism in the genus Bacillus. Bergey's Manual of Determinative Bacteriology describes no species with the characteristics observed. A search in the microbiological literature did not reveal any oxalate degrading alkalophilic Bacillus.

A deposit of the oxalate-degrading alkalophilic Bacillus species was lodged at the Australian Government Analytical Laboratories (AGAL) of 1 Suakin Street, Pymble, New South Wales 2073, Australia on Feb. 7, 1991. AGAL is an International Depository Authority under the Budapest Treaty on the International Recognition of the Deposit of Micro-organisms for the Purposes of Patent Procedure. AGAL has allocated the deposit the official Accession No. N91/005579.

The preferred method and system of biological disposal of oxalates will now be described with reference to FIG. 2. The system illustrated schematically in FIG. 2 includes a biological reactor 10 comprising a reservoir in the form of a vessel 12 for containing an aqueous solution in which oxalate-degrading aerobic microorganisms are present. The vessel 12 has an input 14 for receiving oxalate into the solution in a controlled manner for degradation, and an output 16 for removing effluent from the reservoir. The reactor further comprises aerating means 18 for aerating the solution contained in the reservoir to maintain a predetermined dissolved oxygen level in the solution whereby, in use, the micro-organisms are capable of degrading the oxalate in solution so that the concentration of oxalate in the effluent is substantially reduced.

Aerating means 18 may take any suitable form such as, for example, a piping grid (not shown) mounted in the vessel 12 and fitted with self-cleaning nozzles for generating bubbles in the solution. Aerating means 18 further comprises an oxygen probe 20 for monitoring the level of dissolved oxygen in the solution in the reservoir, and control means 22 for controlling the generation of bubbles from the piping grid responsive to a signal from the oxygen probe 20. Aerating means 18 is necessary to ensure that the vessel's contents are held in an aerobic state with the dissolved oxygen level being typically in the range 1 to 10 mg/L, more typically in the range 4 to 7 mg/L.

In this embodiment a disused storage tank was employed for the vessel 12, modified by installing a grid of pipes on the floor of the tank for the distribution of air through a system of self cleaning nozzles Any vessel with sufficient volume to provide an adequate residence time for the oxalate degradation to occur would be suitable. The vessel should typically have a volume of several thousand cubic meters. The tank also has facilities for the removal of any accumulated sludge or alumina hydrate contained in the sodium oxalate filter cake or precipitated from the feed liquor. Control means 22 is preferably in the form of micro-processor controller, which may also be employed to monitor the pH level of the solution in the vessel 12 by being connected to a suitable pH probe (not shown). The pH of the solution in the vessel 12 is typically maintained at between 9 and 11 by the controlled introduction of the highly alkaline solution from dissolver tank 24 into the reservoir 10.

The system further comprises a dissolver tank 24 for dissolving oxalate-containing-solids in an aqueous solution and for dissolving nutrients added to the aqueous solution for biological growth. Preferably, the sodium oxalate is introduced into the dissolver tank in the form of Bayer Liquor Purification Process (LPP) cake or filter cake or thickened sodium oxalate slurry. Nitrogen and phosphorous are generally necessary for biological growth. Other trace elements such as Mn, Cu, Zn, No, Se, Ca, Mg and Co may also be required. Due to the high pH levels associated with Bayer alumina refineries and the preference for use of an alkalophilic Bacillus species to degrade sodium oxalate at high pH levels, it has been found that the optimum method of nitrogen addition is in the form of the nitrate ($NO_3^-$) radical.

The use of nitrate as the nitrogen source avoids the loss of nutrient that would occur if ammonia or its salts were used at these elevated pH levels. Phosphorous addition has been found to be not normally necessary as alumina refinery liquors usually carry some phosphorous as an impurity extracted from the bauxite. Some of the required phosphorous will be obtained from the process water while the remainder will be derived from the liquor entering the biological reactor associated with the sodium oxalate filter cake. If additional phosphorous is required it can most conveniently be obtained by dosing with liquid phosphoric acid.

A pump 26 is provided for pumping the dissolved oxalate and nutrients in solution into the biological reactor. The dissolver tank is preferably provided with an agitator to enhance the rate of dissolution of the oxalate filter cake and nutrients in the aqueous solution.

The system preferably further comprises a causticiser for causticising the effluent from the biological reactor to convert the sodium carbonate and bicarbonate to useful sodium hydroxide (caustic soda). Causticisation is performed by adding calcium hydroxide in the form of lime slurry to the effluent in a causticiser reaction tank 28. The sludge in the causticised effluent is then allowed to settle in a settler tank 34. Causticisation in the tank 28 can be very efficient due to the low soda concentration in the effluent and the very low dissolved alumina concentration. Efficiencies of above 80% (CaO conversion to $CaCO_3$ basis) can be achieved at ambient temperatures (22°–26° C.). A pump 30 pumps the effluent from the vessel 12 into the causticiser reaction tank 28, and a pump 32 pumps the causticised effluent into the causticiser settler tank 34. A further pump 36 removes the causticiser sludge from the tank 34 to be disposed of with the bauxite residue.

Causticisation is a particularly advantageous process in the preferred system as it results in substantial soda savings. The effluent from the reactor contains sodium hydrogen carbonate ($NaHCO_3$) as a result of the biological degradation of sodium oxalate according to the equation:

$$2Na_2C_2O_4 + 2H_2O + O_2 \rightarrow 4NaHCO_3$$

When free caustic soda is present, as is usually the case with process waters associated with a Bayer alumina refinery, and Bayer liquor contained in the sodium oxalate filter cake or thickened slurry, then a mixed carbonate/bicarbonate solution will result:

$$NaHCO_3 + NaOH \rightarrow Na_2CO_3 + H_2O$$

Causticisation with lime slurry then converts the sodium carbonate and bicarbonate to sodium hydroxide. The recovery of sodium hydroxide from the effluent results in soda savings of approximately 0.6 tonne/tonne of sodium oxalate. It is estimated that this will result in savings of over 5600 tonnes per annum at the Worsley Alumina refinery alone.

Figure 2:
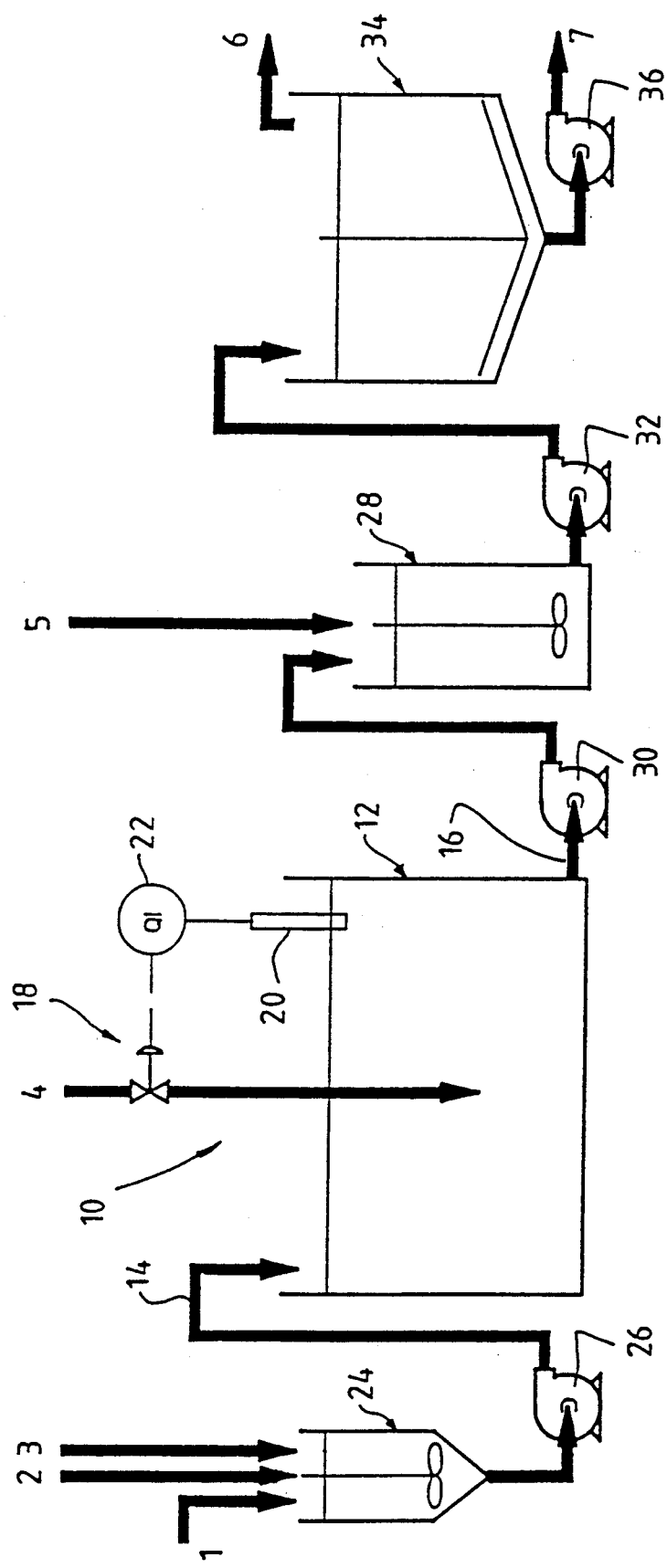
FIG. 2 is a schematic illustration of a preferred system for biological disposal of oxalate.

The process for the biological degradation of sodium oxalate at high pH levels in the system of FIG. 2 is as follows. Sodium oxalate filter cake 1 together with process water 2 is fed to the dissolver tank 24 and dissolves in aqueous solution together with nutrients and trace elements 3 as required. Condensate may be used to supplement the process water in order to maintain the refinery's water balance. The dissolved sodium oxalate is then pumped to the aerated biological reactor vessel 12. The dissolved oxygen level and pH level of the solution in the vessel 12 is continuously monitored so that the aeration and the rate at which the oxalate is introduced to the reservoir can be automatically controlled.

It is preferred that the system be operated as a continuous feed process rather than a batch process, however a batch process would also operate successfully though less efficiently. With a typical reactor tank volume of, for example, 2000 cubic meters and a flow rate of 40 cubic meters/hour of the dissolved oxalate containing solution the pH can be stabilised at around 9.5 to 10.5. The residence time of the oxalate in the reactor is maximised by the mixing produced due to aeration and can be further controlled by the use of baffles if necessary. With the above flow rate the residence time is approximately 50 hours to achieve 100% degradation of the oxalate.

Biological degradation of the sodium oxalate occurs in the reactor vessel, and following the required residence time the effluent from the biological reactor is pumped to the causticiser tank to be causticised with lime slurry. The causticised effluent can then be returned to the refinery process liquor circuit. The method of return of this effluent to the liquor circuit will vary from one refinery to another, but useful methods include its use as lime slaking water and in the washing of bauxite residue. Some of the biomass present in the effluent will have dissolved during the causticisation process but most will remain with the causticisation sludge and should be disposed of with the bauxite residue.

While a large water body, such as the refinery catchment lake, may be used as a biological reactor at an alumina refinery to degrade sodium oxalate, the process is more easily optimised if carried out in a process unit system as described above. The system described allows for the optimisation of dissolved oxygen level, temperature, nutrients, pH level and residence times to increase the oxalate degradation rate.

If a large water body is used as the biological reactor, the Bacillus species will still require dissolved oxygen, nutrients and trace elements, however the levels required are much lower. Such a water body will be much larger than the vessel in the system described above, and therefore the oxalate degradation rates do not need to be as high to satisfy the daily oxalate removal requirements of an alumina refinery. The whole water body must be held in an aerobic state both for the biological degradation of the oxalate and for the degradation of the biomass produced during the oxalate degradation. The preferred method of aeration would be by the use of surface mounted mechanical aerators.

The following example exemplifies various preferred features of the invention.

EXAMPLE

A simulation of the preferred form of biological reactor was carried out in which a vessel was continuously dosed with a dissolved sodium oxalate solution for over 90 days. The vessel was initially filled with process water from the Worsley Alumina Refinery's catchment lake and was continuously aerated by bubbling air through the vessel's contents. The sodium oxalate feed solution was prepared by dissolving sodium oxalate filter cake from the Refinery's liquor purification facility in process water. Sodium nitrate was added to this solution as a nutrient to make it 2 millimolar with respect to nitrate. During the course of this simulation many batches of feed solution were prepared and while the sodium oxalate concentration varied between 23.2 and 24.5 g/l the pH of the feed solution was always above 12.4. This solution was then continuously dosed to the aerated reactor vessel containing process water inoculated with the preferred alkalophilic Bacillus species.

Figure 3:
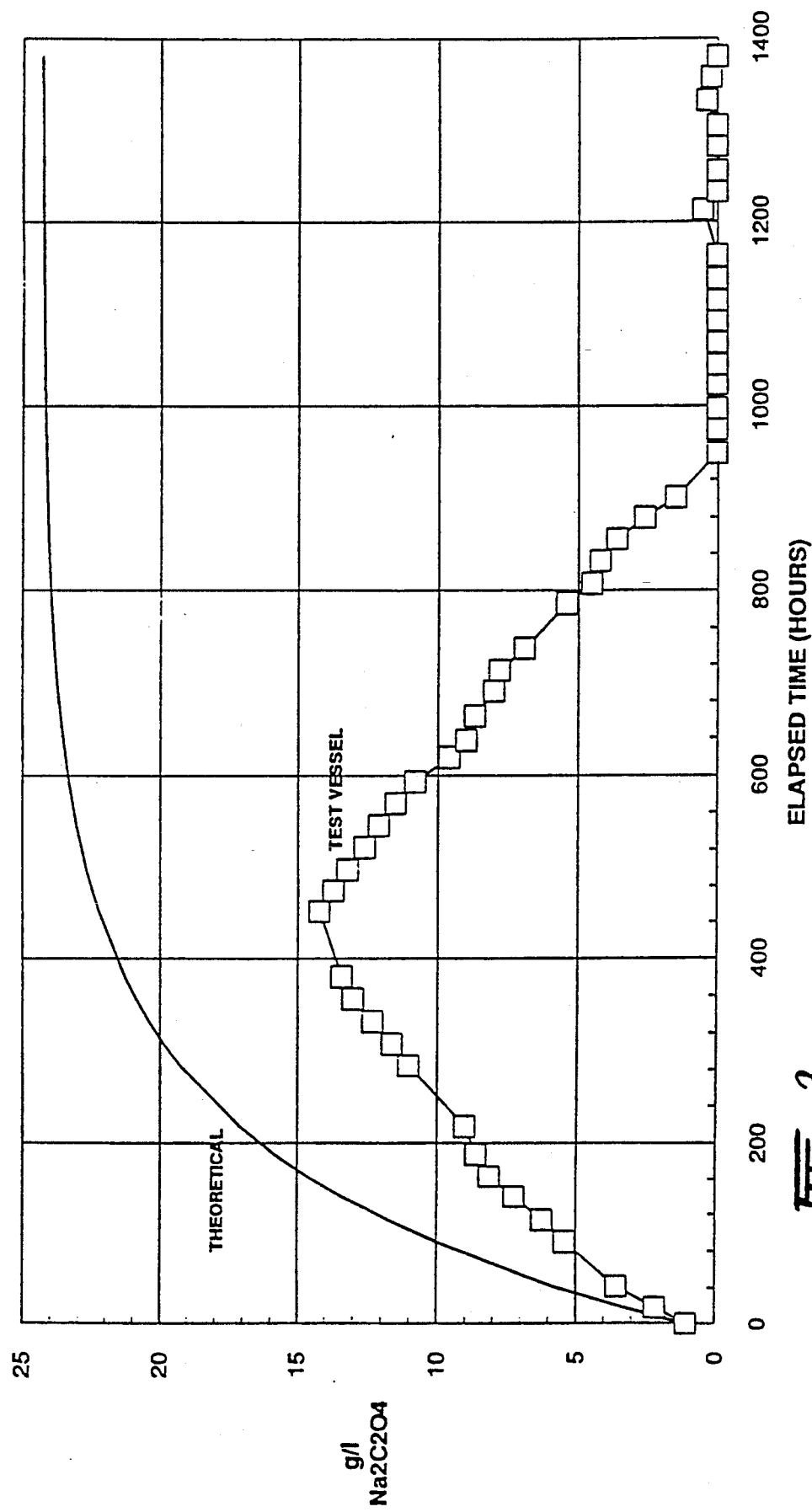
FIG. 3 is a graphical representation of the results of one example of oxalate degradation in a biological reactor simulation.
Figure 4:
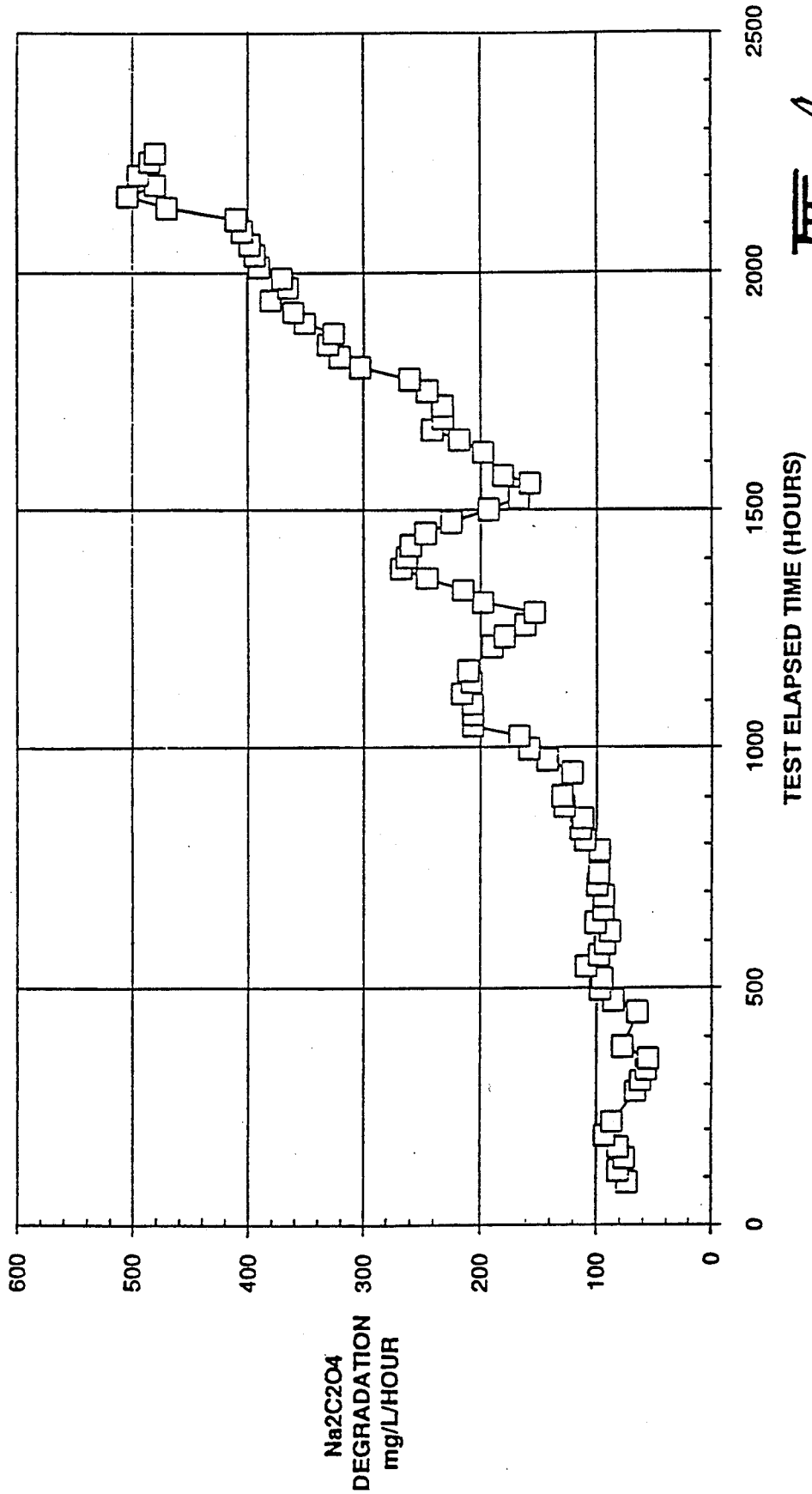
FIG. 4 is a graphical representation of the rate of biological degradation in the simulation of FIG. 3; and, FIG. 5 is an electron microscope image of a preferred oxalate-degrading Bacillus species (negatively-stained, magnification x 20,340).

At the start of the simulation the feed rate was conservative and the hydraulic retention time was 180 hours. After an initial increase in the sodium oxalate level in the reactor vessel a rapid decline occurred and then the feed rate was progressively increased. The feed rate was increased in order to determine what sodium oxalate degradation rates could be achieved. During the course of the test the vessel's temperature was controlled and was progressively increased from 18° C. to 32° C. in order to determine what degradation rate improvement could be achieved at slightly elevated temperatures. The rate of degradation improved as the temperature increased. Furthermore, as the feed rate was increased the hydraulic retention time decreased and was down to 48 hours after 90 days. The sodium oxalate concentration in the vessel for the first 58 days and the calculated degradation rate throughout the simulation are illustrated in FIGS. 3 and 4 respectively.

The results of this extended test have shown that a highly buffered mixture of $Na_2CO_3$ and $NaHCO_3$ is produced in the effluent. The pH of the effluent remained between 9.9 and 10.2 and was resistant to sudden changes in caustic input. As can be seen most clearly in FIG. 4 the sodium oxalate degradation rate progressively increased to 480 mg/l/Hour and was found to always recover rapidly if equipment or operational problems occurred.

The oxygen consumption rate was found to be stoichiometric with the sodium oxalate degradation according to the equation:

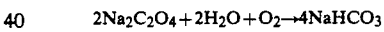

$$2Na_2C_2O_4 + 2H_2O + O_2 \rightarrow 4NaHCO_3$$

From the above description of the preferred method and system of biological disposal of oxalates, it will be apparent that an oxalate degradation process operating at high pH levels using an alkalophilic Bacillus species offers significant advantages over other methods of sodium oxalate destruction.

When sodium oxalate is removed from the Bayer alumina refinery liquor circuit the sodium oxalate is first crystalised and then filtered from the caustic liquor. The oxalate crystals are typically either fine needles or small balls. In either case the filter cake de-liquors poorly and the resultant filter cake carries a significant quantity of caustic liquor. As sodium oxalate is water soluble, any attempts to wash this caustic from the filter cake, in order to lower the pH in a later processing step, would dissolve oxalate and make the oxalate removal process extremely inefficient The sodium oxalate filter cake (carrying up to 55% w/w caustic liquor) would require an expensive neutralisation step to be carried out if a biological destruction process that operated at high pH levels were not available. This neutralisation step and the resultant cost and operational disadvantages are avoided when the oxalate degradation can be carried out at pH levels of 9 or above.

Another advantage of using an alkalophilic Bacillus species is the lower yield of biomass formed during the oxalate degradation. Alkalophilic bacteria maintain a more acid internal environment (pH<9) and their capacity to maintain their internal pH at 9 or less governs whether they can survive the alkaline pH imposed. However, maintaining a pH gradient of 2 units (100 x concentration gradient) is highly energy-expensive, and cell yields are therefore very much less than the theoretical. This reduction in cell yield has important implications for biological oxalate disposal. Any reduction in biomass production will make biomass disposal less of a problem. If the effluent from a biological reactor is to be returned to the liquor circuit of a Bayer alumina refinery, then a reduction in cell yield during the oxalate degradation will result in less organic carbon returning to the process liquor.

As noted above, the favoured method of biological degradation results in the production of sodium carbonate and bicarbonate which can be readily converted to sodium hydroxide by causticisation. This facilitates efficient recycling of the caustic soda and results in significant soda savings for the refinery. This is a further advantage of the method and system of biological disposal of oxalate described.

It will be apparent to persons skilled in the micro-biological, biochemical and chemical arts that numerous variations and modifications to the preferred method and system for biological disposal of oxalate described above may be implemented. A skilled addressee will understand that having provided a preferred micro-organism, subsequent manipulations could be made to that strain to enhance its utility for oxalate degradation. Such manipulations include standard mutagenic techniques and the use of recombinant DNA techniques to introduce desirable properties or to inactive undesirable properties in the preferred strain. The present invention also includes these variants and the use thereof within its scope. All such variations and modifications are to be considered within the scope of the present invention, the nature of which is to be determined from the foregoing description and the appended claims.

The claims defining the invention are as follows:

1. A biologically pure culture of Bacillus species AGAL N91/005579.

2. A method of biological disposal of sodium oxalate produced as a by-product of the Bayer process in an alumina refinery, the method comprising:
   introducing the sodium oxalate into a biological reactor comprising an aqueous solution in which an alkalophilic oxalate-degrading aerobic micro-organism is present, wherein said alkalophilic oxalate-degrading micro-organism is Bacillus AGAL N91/005579; and,
   maintaining the aqueous solution in an aerobic condition such that the sodium oxalate in the reactor can be degraded by the alkalophilic oxalate-degrading aerobic micro-organism.

3. A method of biological disposal of oxalate as defined in claim 1, further comprising an initial step, prior to said step of introducing the oxalate into the biological reactor, of dissolving the sodium oxalate in an aqueous solution.

4. A method of biological disposal of oxalate as defined in claim 3, wherein said initial step also includes adding selected trace elements and nutrients for biological growth.

5. A method of biological disposal of oxalate as defined in claim 4, further comprising the step of maintaining the pH level of the solution in the reactor at a level at which the micro-organism can grow.

6. A method of biological disposal of oxalate as defined in claim 5, wherein said step of maintaining the pH level is effected by maintaining a substantially continuous flow of the aqueous solution containing sodium oxalate into the biological reactor.

7. A method of biological disposal of oxalate as defined in claim 5, wherein the pH level is maintained within the range 9.0 to 11.0.

8. A method of biological disposal of oxalate as defined in claim 7, further comprising adding calcium hydroxide or calcium oxide to effluent from the biological reactor to convert sodium carbonate and bicarbonate to sodium hydroxide.

* * * * *

UNITED STATES PATENT AND TRADEMARK OFFICE
CERTIFICATE OF CORRECTION

PATENT NO. : 5,314,806
DATED : May 24, 1994
INVENTOR(S) : Morton et al

It is certified that error appears in the above-indentified patent and that said Letters Patent is hereby corrected as shown below:

Claim 3, Col. 12, line 17, "claim 1" should read —claim 2—.
Abstract, line 8, "or" should read —of—.

Signed and Sealed this

Twenty-third Day of August, 1994

Attest:

BRUCE LEHMAN

Attesting Officer

Commissioner of Patents and Trademarks